(12) United States Patent
Callahan et al.

(10) Patent No.: US 11,639,234 B2
(45) Date of Patent: May 2, 2023

(54) METHOD, SYSTEM AND APPARATUS FOR ALIGNING A REMOVABLE SENSOR ON A VEHICLE

(71) Applicant: THE BOEING COMPANY, Chicago, IL (US)

(72) Inventors: Kevin S. Callahan, Shoreline, WA (US); Nick S. Evans, Lynnwood, WA (US); Eric R. Muir, Bothell, WA (US)

(73) Assignee: The Boeing Company, Chicago, IL (US)

( * ) Notice: Subject to any disclaimer, the term of this patent is extended or adjusted under 35 U.S.C. 154(b) by 874 days.

(21) Appl. No.: 16/393,376

(22) Filed: Apr. 24, 2019

(65) Prior Publication Data

US 2020/0339274 A1   Oct. 29, 2020

(51) Int. Cl.
*B64D 43/00* (2006.01)
*G01S 7/497* (2006.01)
(Continued)

(52) U.S. Cl.
CPC .............. *B64D 43/00* (2013.01); *B60R 11/04* (2013.01); *G01S 7/4972* (2013.01); *B60R 2011/004* (2013.01); *B60R 2011/0052* (2013.01)

(58) Field of Classification Search
CPC ......... B64D 43/00; B60R 11/00; B60R 11/04; B60R 2011/004; B60R 2011/008;
(Continued)

(56) References Cited

U.S. PATENT DOCUMENTS 4,790,651 A   12/1988   Brown et al.
6,020,844 A   2/2000   Bai et al.
(Continued)

FOREIGN PATENT DOCUMENTS

DE         4222409 A1     1/1993
DE      102013021616      6/2015
(Continued)

OTHER PUBLICATIONS

Towards Data Science, *Tracking a self-driving car with high precision*, dated Apr. 30, 2017, 4 pgs.
(Continued)

*Primary Examiner* — Lori L Lyjak
(74) *Attorney, Agent, or Firm* — Quinn IP Law

(57) ABSTRACT

A method for aligning a removable sensor on a vehicle includes connecting the removable sensor to a sensor mounting device. The method further includes connecting a connector of an alignment apparatus to either (i) the removable sensor such that a spatial reference component of the alignment apparatus has a known position and orientation relative to a current position and orientation of the removable sensor or (ii) a fixed connection location on the vehicle such that the spatial reference component indicates a desired position and orientation of the removable sensor. In addition the method includes adjusting the current position and orientation of the removable sensor by reference to the alignment apparatus to cause the current position and orientation of the removable sensor to match the desired position and orientation of the removable sensor.

20 Claims, 10 Drawing Sheets

(51) Int. Cl.
*B60R 11/04* (2006.01)
*B60R 11/00* (2006.01)

(58) Field of Classification Search
CPC ..... B60R 2011/0052; B60R 2011/0059; G01S 7/4972
See application file for complete search history.

(56) References Cited

U.S. PATENT DOCUMENTS

| | | | |
|---|---|---|---|
| 6,418,775 B1 * | 7/2002 | Sager | G01S 7/4972 73/1.79 |
| 6,744,399 B2 * | 6/2004 | Tohyama | G01S 7/4026 342/174 |
| 8,259,174 B2 | 9/2012 | Zhang et al. | |
| 10,054,843 B2 | 8/2018 | Ye | |
| 10,073,178 B2 * | 9/2018 | Hara | G01S 7/4813 |
| 10,818,091 B2 | 10/2020 | Evans et al. | |
| 10,878,709 B2 | 12/2020 | Dame et al. | |
| 11,113,570 B2 | 9/2021 | Muir et al. | |
| 2008/0186384 A1 | 8/2008 | Ishii et al. | |
| 2016/0209500 A1 | 7/2016 | Markendorf | |
| 2017/0103546 A1 | 4/2017 | Wang et al. | |
| 2018/0342082 A1 | 11/2018 | Lewis et al. | |

FOREIGN PATENT DOCUMENTS

| | | |
|---|---|---|
| DE | 202015106939 U1 | 4/2016 |
| DE | 102016206516 A1 | 10/2017 |
| EP | 1001274 A1 | 5/2000 |
| EP | 1031852 A2 | 8/2000 |
| EP | 1103823 A2 | 5/2001 |
| EP | 1340998 A1 | 9/2003 |
| EP | 2113787 A1 | 11/2009 |
| WO | WO-2015011323 A1 | 1/2015 |
| WO | WO-2018000037 A1 | 1/2018 |

OTHER PUBLICATIONS

Extended EP Search Report and Written Opinion for EP Application No. 20166586.6 dated Sep. 18, 2020.
Extended EP Search Report and Written Opinion for EP Application No. 20166580.9 dated Sep. 21, 2020.

* cited by examiner

METHOD, SYSTEM AND APPARATUS FOR ALIGNING A REMOVABLE SENSOR ON A VEHICLE

FIELD

This disclosure relates to mounting sensors on a vehicle and more particularly to aligning removable sensors to provide a desired alignment.

BACKGROUND

Computer vision systems are employed on vehicles to monitor the surrounding environment of the vehicle using various sensors and, in some instances, to control vehicle operation using the sensor data from digital cameras, Light Detection and Ranging ("LIDAR") units, and similar sensors. Although computer vision techniques offer many benefits, they are sensitive to changes in location or orientation of the sensors. In order to utilize computer vision systems fully, the sensor position and orientation during operation of an operational vehicle must be comparable to the sensor position and orientation used in a training or learning vehicle (or other previous use) or model generation. With sensors needing to be originally installed on operational or training vehicles or to be occasionally removed or replaced over the operational life of the operational or training vehicle, the sensor alignment must occur whenever a sensor is installed or reinstalled on the vehicle. In installing or reinstalling the sensor, a desired position and orientation of the sensor needs to be attained so as to maintain the position and orientation comparable between the operational and training vehicles such that the computer vision system is fully utilized. Additionally, sensor location should be consistent across similar vehicles in order to facilitate the generation and use of computer vision systems that may be used on multiple similarly configured vehicles.

While sensor position is important to computer vision systems, sensor alignment presents particular difficulties. While initial sensor placement in a general area of a vehicle is easily done, such placement in an approximate area of the vehicle is insufficient to obtain the high degree of accuracy needed for optimal computer vision systems. Thus, further alignment of sensors is needed to ensure data accuracy.

SUMMARY

An example includes a method for aligning a removable sensor on a vehicle, which includes connecting the removable sensor to a sensor mounting device. The method further includes connecting a connector of an alignment apparatus to either (i) the removable sensor such that a spatial reference component of the alignment apparatus has a known position and orientation relative to a current position and orientation of the removable sensor or (ii) a fixed connection location on the vehicle such that the spatial reference component indicates a desired position and orientation of the removable sensor. In addition the method includes adjusting the current position and orientation of the removable sensor by reference to the alignment apparatus to cause the current position and orientation of the removable sensor to match the desired position and orientation of the removable sensor.

Another example includes a system for aligning a removable sensor on a vehicle, which includes an alignment apparatus having (i) a connector configured to mount the alignment apparatus in a fixed position and orientation relative to the removable sensor and (ii) a spatial reference component adjoined to the connector such that, when the alignment apparatus is mounted in the fixed position and orientation, the spatial reference component has a known position and orientation relative to a current position and orientation of the removable sensor. In addition the system includes an external positioning device having (i) a measurement component configured to detect a spatial position and orientation of the spatial reference component relative to at least one reference location on the vehicle and (ii) an output component configured to provide positioning data relating to the current position and orientation of the removable sensor to a user to facilitate aligning the removable sensor to a desired position and orientation of the removable sensor.

Another example includes an alignment apparatus for positioning a removable sensor on a vehicle, which includes a connector configured to mount the alignment apparatus in a fixed position and orientation relative to a fixed connection location on the vehicle. The alignment apparatus further includes a spatial reference component adjoined to the connector such that, when the alignment apparatus is mounted in the fixed position and orientation, the spatial reference component has a known position and orientation indicating a desired position and orientation of the removable sensor.

The features, functions, and advantages that have been discussed can be achieved independently in various embodiments or may be combined in yet other embodiments further details of which can be seen with reference to the following description and drawings.

DESCRIPTION

Disclosed herein are methods, systems and apparatus for aligning one or more removable sensors on a vehicle, such as digital cameras or LIDAR units on an aircraft. The removable sensors disclosed herein generate sensor output as electronic data regarding the physical local environment around such removable sensors, such as a digital video feed or a three-dimensional spatial map of objects or surfaces in the environment observable by the removable sensors. The following disclosure generally relates to aligning such removable sensors in or on a vehicle utilizing alignment apparatus to obtain a high degree of accuracy in alignment of the removable sensor to a desired position and orientation. The removable sensors may be aligned with previous positions of the same or similar removable sensors, such as when a removable sensor is reinstalled after maintenance or when a new removable sensor is installed to replace a previous removable sensor (e.g., after sensor failure). The removable sensors may likewise be aligned in a corresponding position on multiple vehicles to ensure consistency of sensor position (and thus ensure consistency of sensor data) between multiple vehicles that are similarly configured with removable sensors. Further details regarding utilizing alignment apparatus for such removable sensor alignment are described below.

Figure 1:
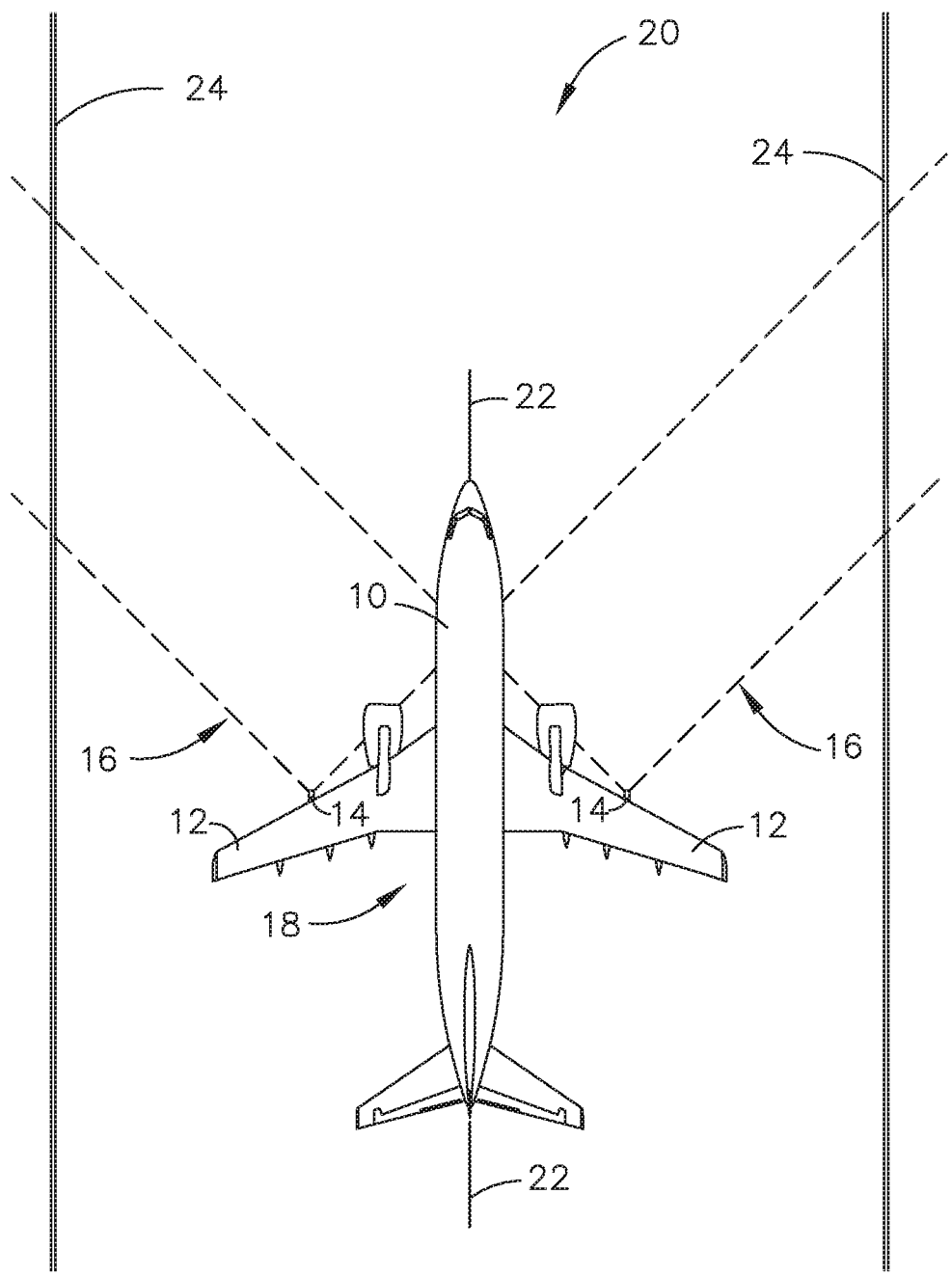
FIG. 1 is a top plan view of a vehicle having a plurality of removable sensors.

FIG. 1 illustrates a top view of an example of a vehicle 10 on which removable sensors 14 are mounted. Although the vehicle 10 is illustrated as a fixed-wing aircraft 18, the techniques described herein are applicable to aligning electronic sensors on other types of vehicles (e.g., automobiles, trains, other types of aircraft, ships, trucks, or industrial equipment). The vehicle 10 is illustrated as being positioned on a taxiway 20 for reference. The taxiway 20 has a centerline 22 for use in centering the vehicle 10 while traveling along the taxiway 20. The taxiway 20 also has edge lines 24 on each side that mark the edge of the usable portion of the taxiway 20. The vehicle 10 includes wings 12, which may include a left wing and a right wing. A plurality of removable sensors 14 are mounted on the vehicle 10 to capture sensor data for portions 16 of the taxiway 20 within the respective field of view of each removable sensor 14.

Each removable sensor 14 is an electronic imaging sensor that generates sensor output as electronic data at each of a plurality of times during sensor operation, from which sensor output a two-dimensional or three-dimensional graphical representation of the corresponding portion 16 of the local environment of the vehicle 10 can be generated. In various embodiments, the removable sensors 14 discussed throughout this document include one or more digital cameras, LIDAR units, radar units, ultrasonic sensor units, or other electronic devices configured to generate electronic images of portions of a local environment. In further embodiments, the removable sensors 14 discussed throughout this document include combinations of two or more of the foregoing types of removable sensors 14, which combinations improve the robustness of the system by using multiple types of image data. Although illustrated as having two removable sensors 14, the vehicle 10 may instead have one removable sensor 14 in other configurations, and the vehicle 10 may have more than two removable sensors 14 in still other configurations. As illustrated, some embodiments include one or more removable sensors 14 mounted on each side (e.g., on each wing 12) of the vehicle 10 to capture sensor data for distinct or partially overlapping portions 16 of the local environment.

Figure 2:
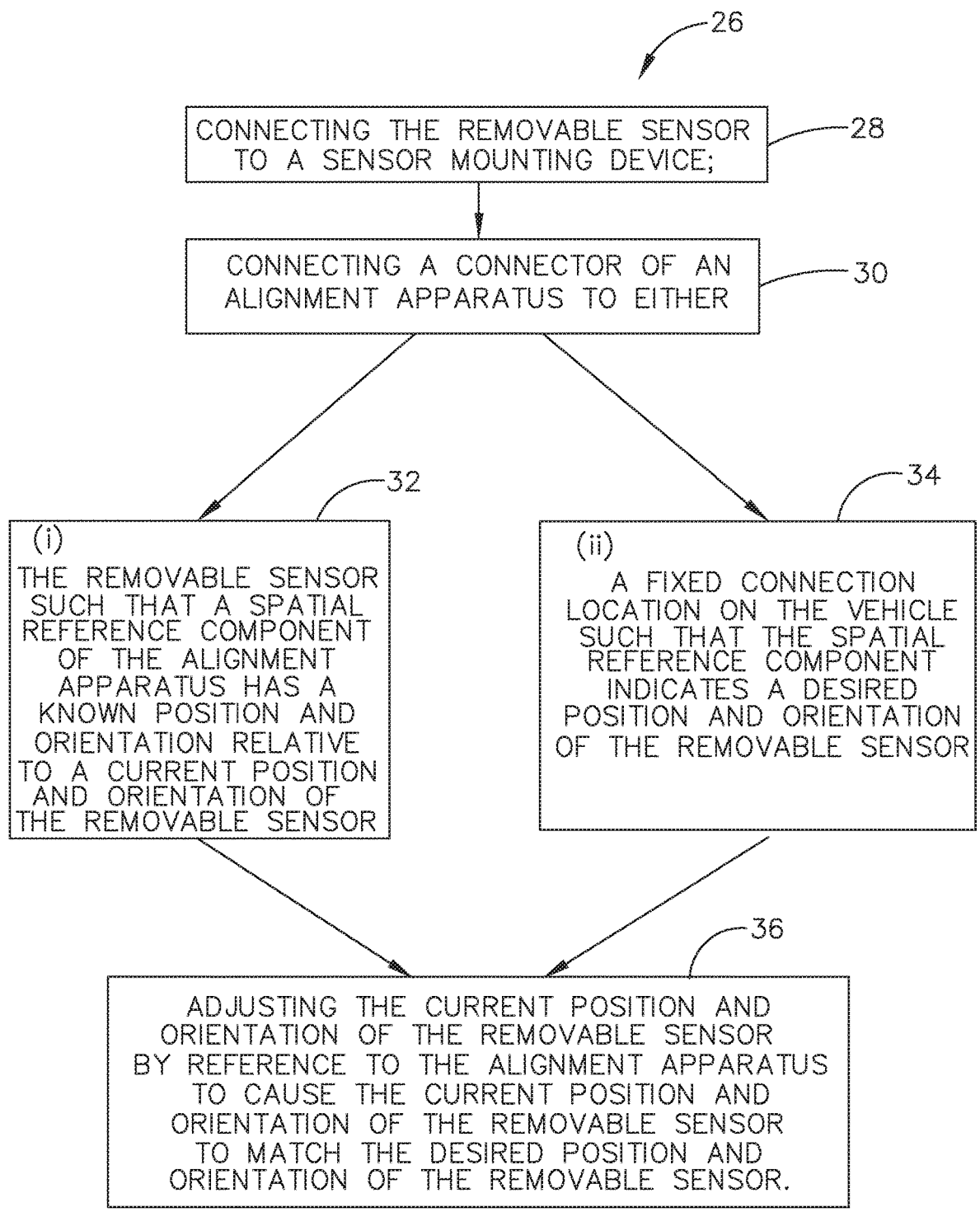
FIG. 2 is a flow chart of a method for aligning a removable sensor on a vehicle.

FIG. 2 illustrates, as a flow chart, a method for aligning a removable sensor 14 on a vehicle 10. Method 26 for aligning a removable sensor 14 on a vehicle 10. Method 26 includes step 28 of connecting removable sensor 14 to a sensor mounting device. Method 26 further includes step 30 of connecting a connector of an alignment apparatus to either step 32 of (i) the removable sensor such that a spatial reference component of the alignment apparatus has a known position and orientation relative to a current position and orientation of the removable sensor or step 34 of (ii) a fixed connection location on the vehicle such that the spatial reference component indicates a desired position and orientation of the removable sensor. Further included in method 26 is step 36 of adjusting the current position and orientation of the removable sensor by reference to the alignment apparatus to cause the current position and orientation of the removable sensor to match the desired position and orientation of the removable sensor. The implementation of method 26 will be discussed herein in greater detail with respect to three different examples of apparatus to implement method 26. The apparatus and corresponding implementation of the three different examples of method 26 will be shown and discussed. With respect to FIGS. 3-5, first example of apparatus for implementing method 26 is shown; with respect to FIGS. 6-8, second example of apparatus for implementing method 26 is shown; and with respect to FIGS. 9 and 10 third example of apparatus for implementing method 26 is shown.

Figure 3:
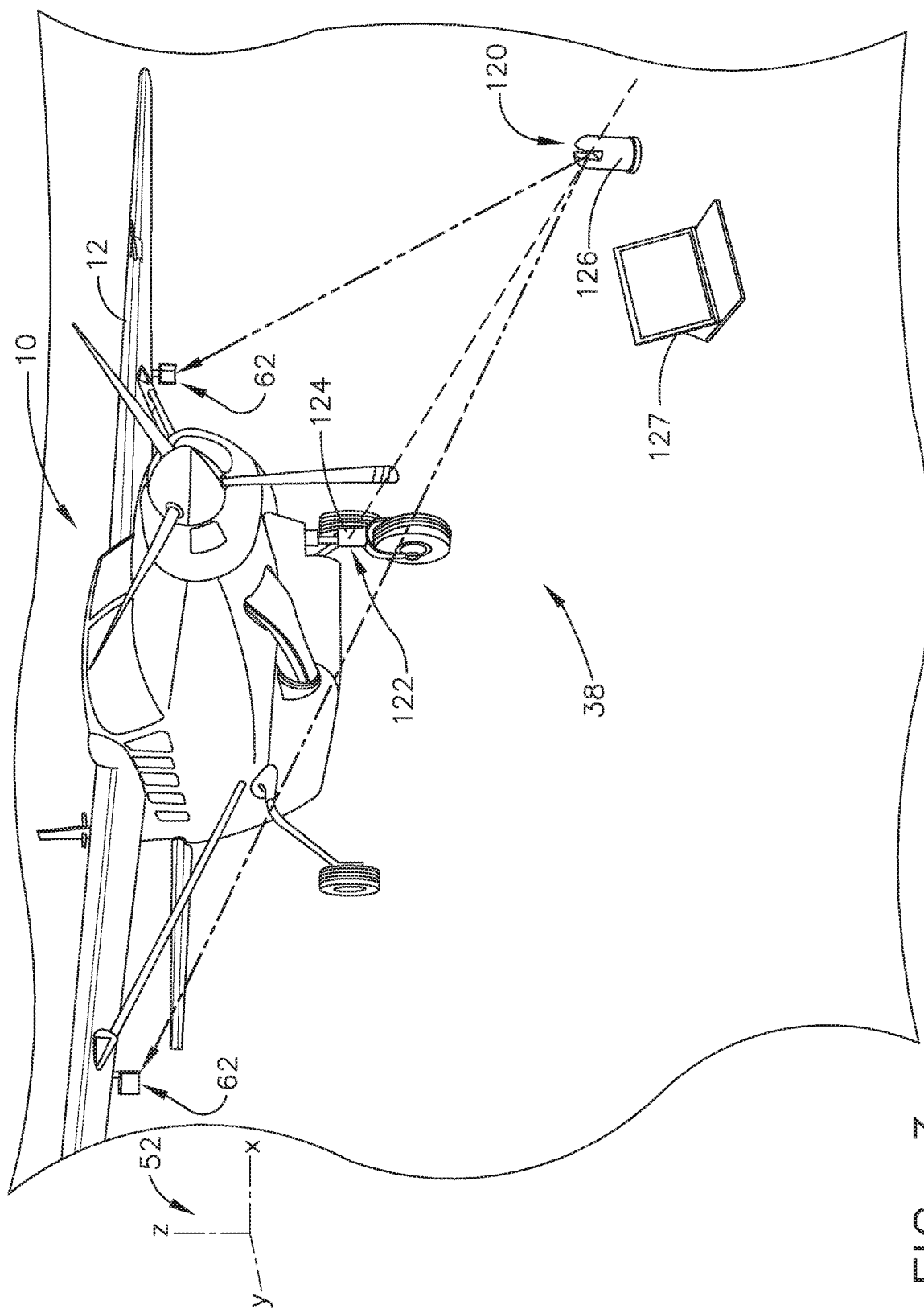
FIG. 3 is a perspective view of a system for aligning a sensor on a vehicle which includes a first example of an alignment apparatus for aligning a sensor on the vehicle.
Figure 4:
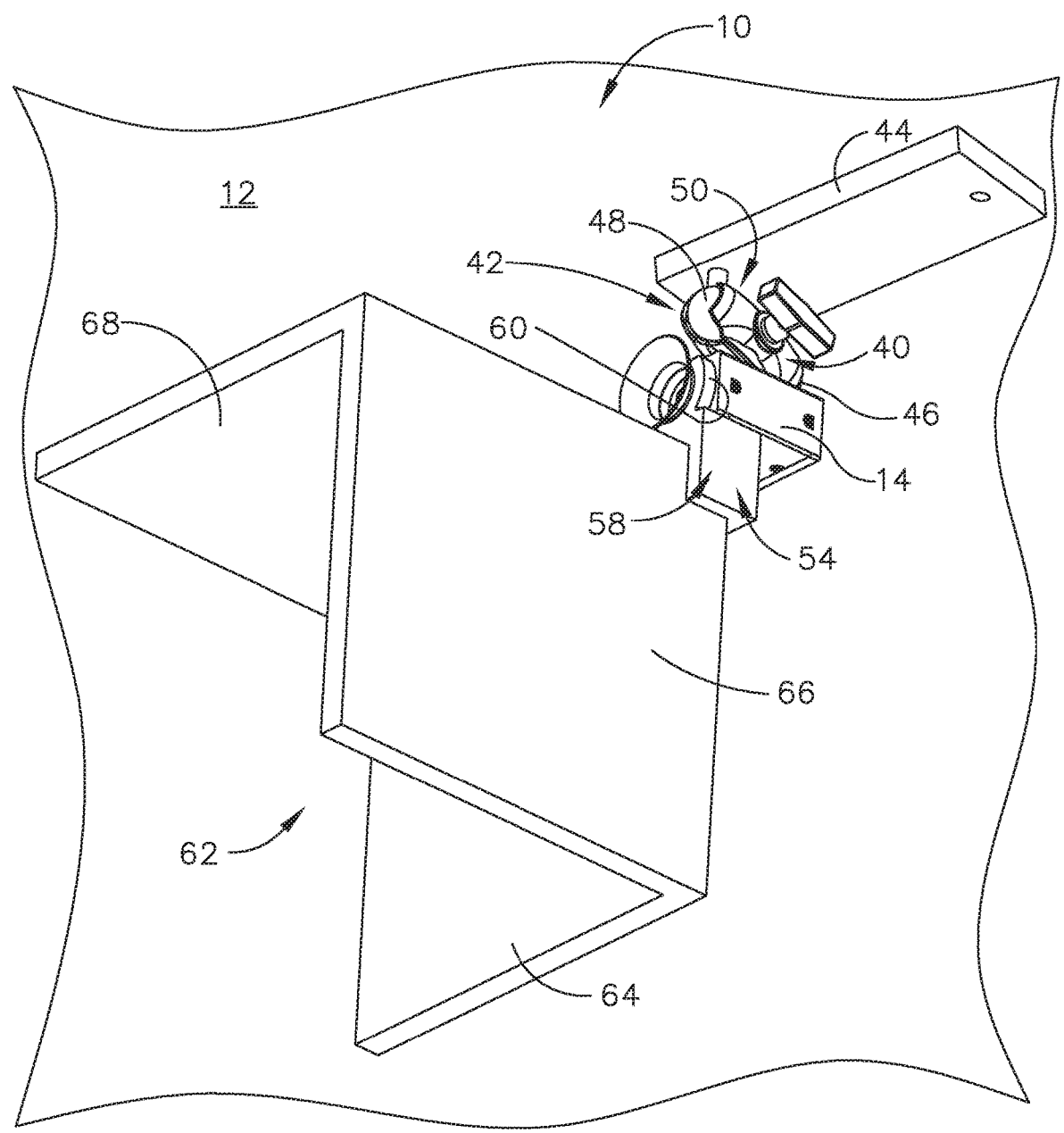
FIG. 4 is an enlarged perspective view of the first example of the alignment apparatus for aligning a sensor into a desired position and orientation on the vehicle of FIG. 3.
Figure 5:
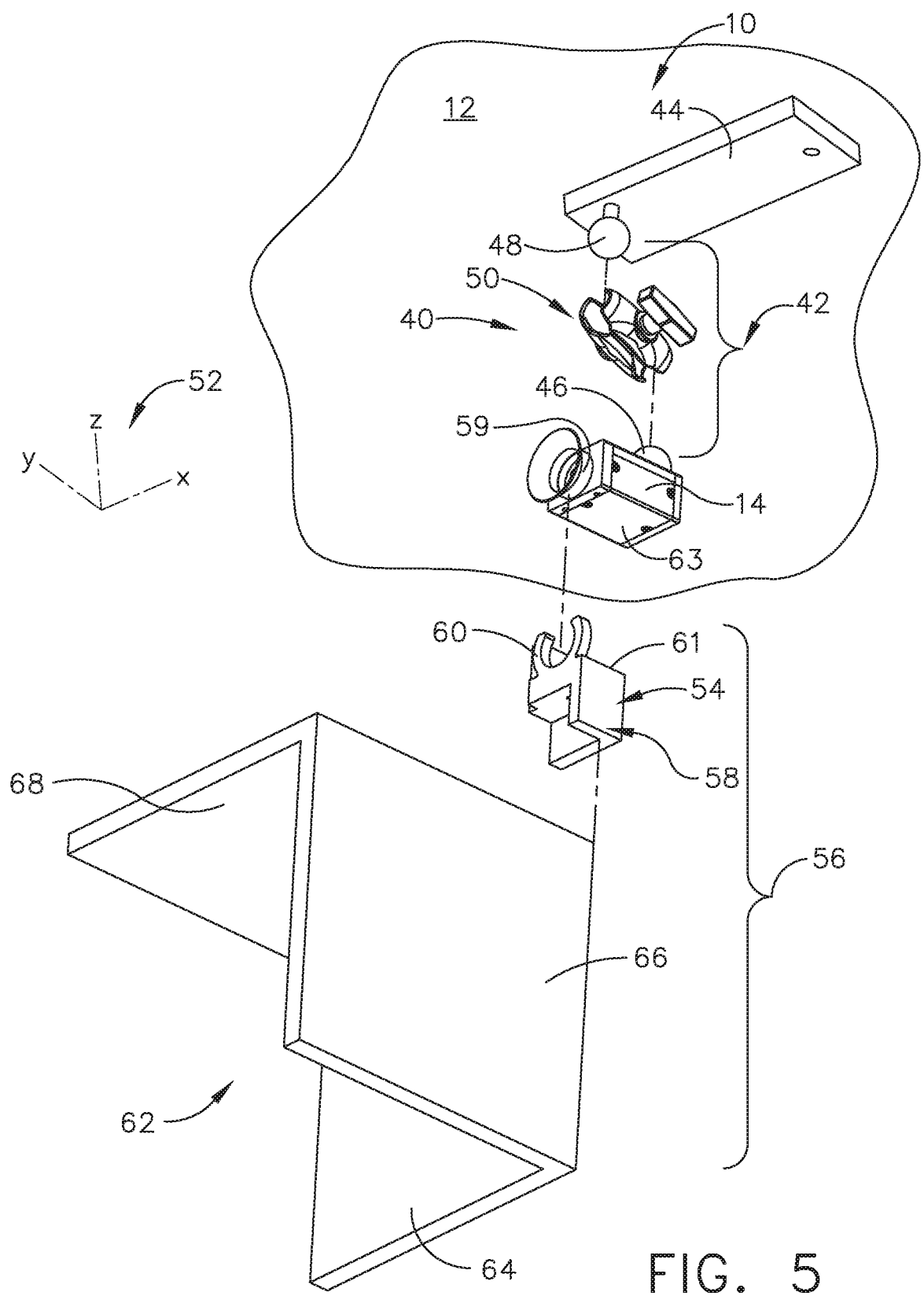
FIG. 5 is an exploded view of the first example of the alignment apparatus of FIG. 4.

In referring to FIGS. 3-5, the first example of apparatus for implementing method 26 for aligning a removable sensor 14 on vehicle 10 is shown. In referring to FIG. 3, system 38 for aligning removable sensor 14 on vehicle 10, which in this example is a training or learning aircraft is shown. System 38, which will be discussed in more detail, also includes apparatus used in implementing the first example of method 26.

Method 26, which utilizes first example of apparatus for implementation, includes step 28, of the flow chart of FIG. 2, of connecting removable sensor 14 to sensor mounting device 40, which includes first ball joint assembly 42. Sensor mounting device 40, in this example, is secured to mounting plate 44 which in turn is secured to vehicle 10, which in this example is secured to wing 12 and is secured to removable sensor 14. First ball joint assembly 42 includes first ball member 46 connected to removable sensor 14 and second ball member 48 connected to vehicle 10. First ball member 46 and second ball member 48 are positioned within clamp assembly 50, which is movable between a clamped and an unclamped position with respect to first ball member 46 and second ball member 48. Clamp assembly 50 in a clamped position locks movement of first ball joint assembly 42 from movement. With clamp assembly 50 in an unclamped position, clamp assembly 50 is allowed to move about first ball member 46 and second ball member 48 permitting clamp assembly 50 to be allowed freedom of movement permitting removable sensor 14 to be able to be moved within any direction within a three dimensional reference system 52 which includes x-direction, y-direction and z-direction. In this first example of method 26, with removable sensor 14 placed within a desired position and orientation, clamp assembly 50 can be clamped locking removable sensor 14 in the desired location and orientation.

Method 26 further includes step 30, as seen in the flow chart of FIG. 2, which includes connecting connector 54 of alignment apparatus 56, as seen in FIGS. 4 and 5, to removable sensor 14 of step 32, as seen in the flow chart of FIG. 2 with respect to method 26. Connector 54, in this example, includes fastener assembly 58 having flexible clamp 60 for engaging the removable sensor 14. Removable sensor 14 in this example is a camera having lens assembly 59 with flexible clamp 60 engaging a portion of lens assembly 59 of the removable sensor 14 or camera as seen in FIGS. 4 and 5. In addition, first surface 61 of fastener assembly 58 provides a surface for abutting against second surface 63 of removable sensor 14. With flexible clamp 60 engaged to removable sensor 14 and first surface 61 and second surface 63 abutting one another, fastener assembly 58 and removable sensor 14 are in a fixed position in relationship to one another preventing independent movement between fastener assembly 58 and removable sensor 14 or in this example camera.

In this first example, spatial reference component 62 of alignment apparatus 56 includes three wall members 64, 66 and 68 secured to one another in orthogonal relationship to one another. Fastener assembly 58 is fixedly secured to spatial reference component 62 such as by way of bolting (not shown) fastener assembly 58 to spatial reference component 62. With fastener assembly 58 of connector 54 secured to removable sensor 14 and fastener assembly 58 secured to spatial reference component 62, spatial reference component 62 has a known position and orientation relative to a current position and orientation of removable sensor 14, of step 32 as referred to seen in the flow chart with respect to method 26 in FIG. 2. Thus, with the user knowing the position and orientation of spatial reference component 62 the current position and orientation of removable sensor 14 is known.

Method 26 further includes step 36 of adjusting the current position and orientation of the removable sensor 14 by reference to alignment apparatus 56 to cause the current position and orientation of removable sensor 14 to match the desired position and orientation of removable sensor 14, as set forth in step 36 for method 26 in FIG. 2. Step 36 includes, in this example, positioning clamp assembly 50 into the unclamped position with respect to first ball member 46 and second ball member 48 of first ball joint assembly 42 and moving removable sensor 14 from the current position and orientation of removable sensor 14 to match the desired position and orientation of removable sensor 14. With referring to spatial reference component 62, which is in a known fixed position and orientation relationship with respect to removable sensor 14, the user can adjust the position and orientation of removable sensor 14 and confirm the current position and orientation of removable sensor 14 in referring to the position and orientation of spatial reference component 62. This methodology can be carried out in positioning and orienting removable sensor 14 so as to attain the desired position and orientation for removable sensor 14. The referring to the position and orientation of spatial reference component 62 will be discussed in further detail with respect to system 38 wherein determining the position and orientation of spatial reference component 62 will be used to identify the position and orientation of removable sensor 14 such that should removable sensor 14 not be in the desired position and orientation the identified position and orientation of spatial reference component 62 will provide the user the data needed of the current position and orientation of removable sensor 14 so as to be able to adjust removable sensor 14 to match the desired position and orientation.

Figure 6:
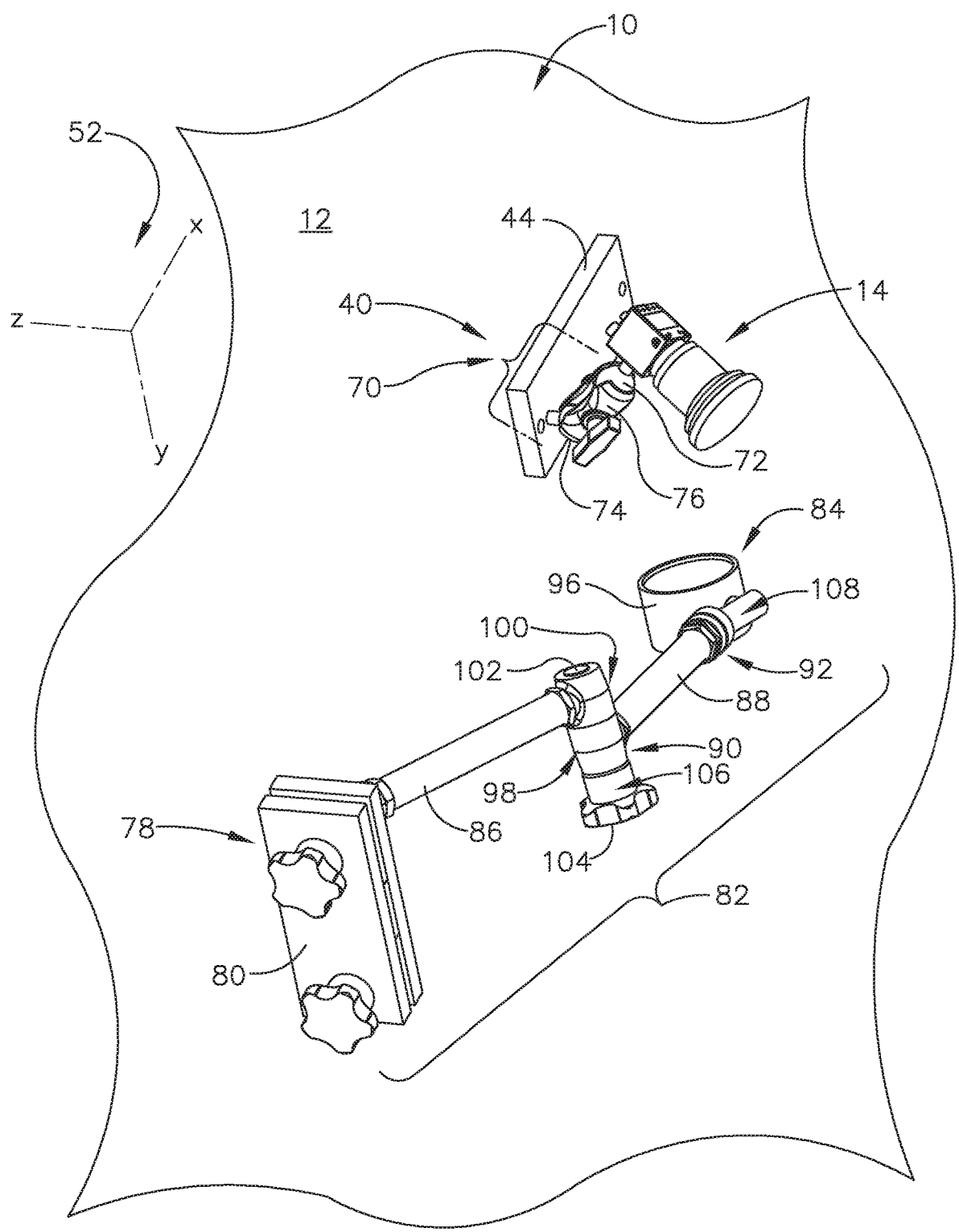
FIG. 6 is a perspective view of a second example of an alignment apparatus for aligning a sensor on a vehicle with the sensor to be aligned is secured to the vehicle.
Figure 7:
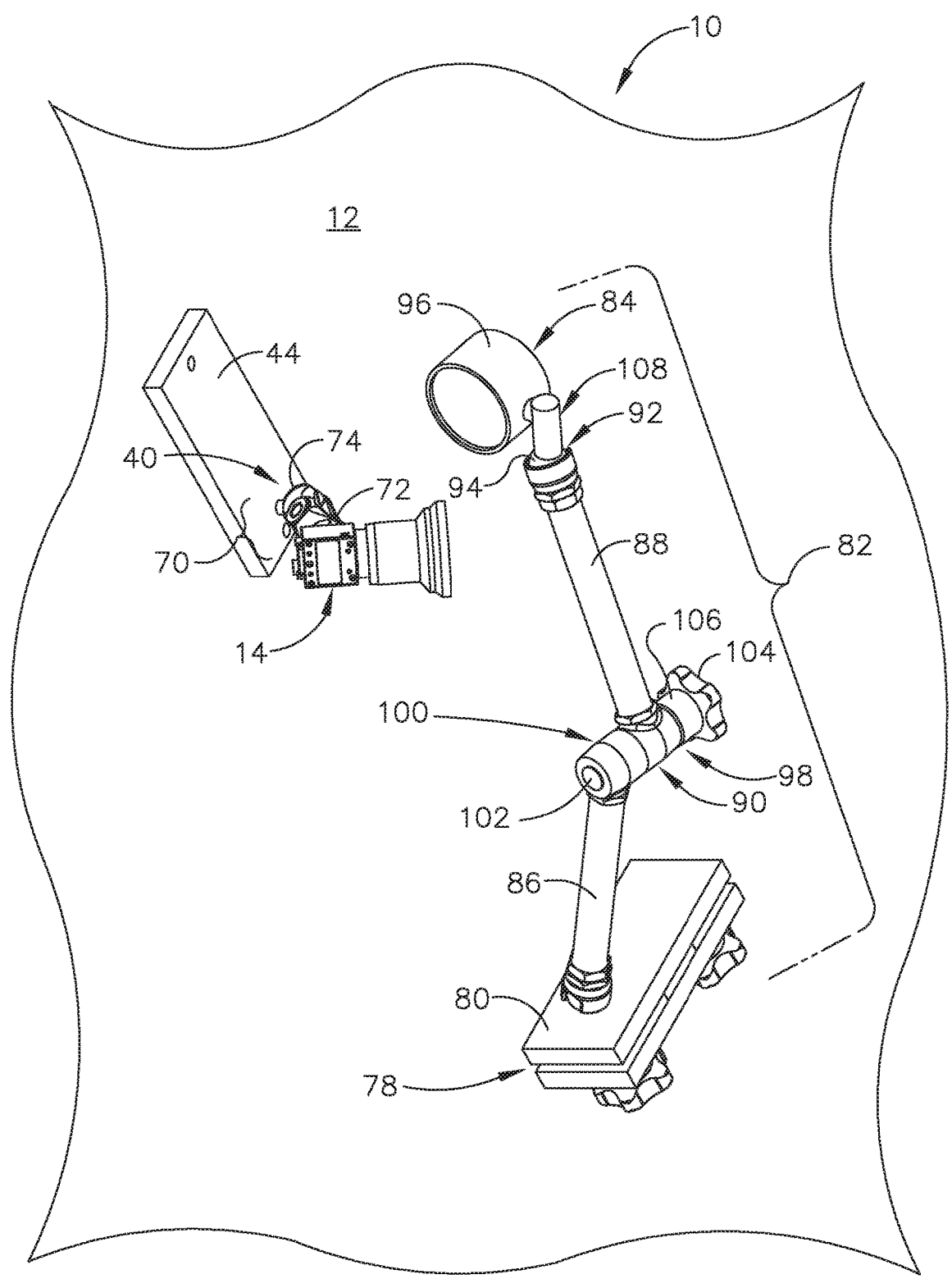
FIG. 7 is a reverse perspective view of FIG. 6.
Figure 8:
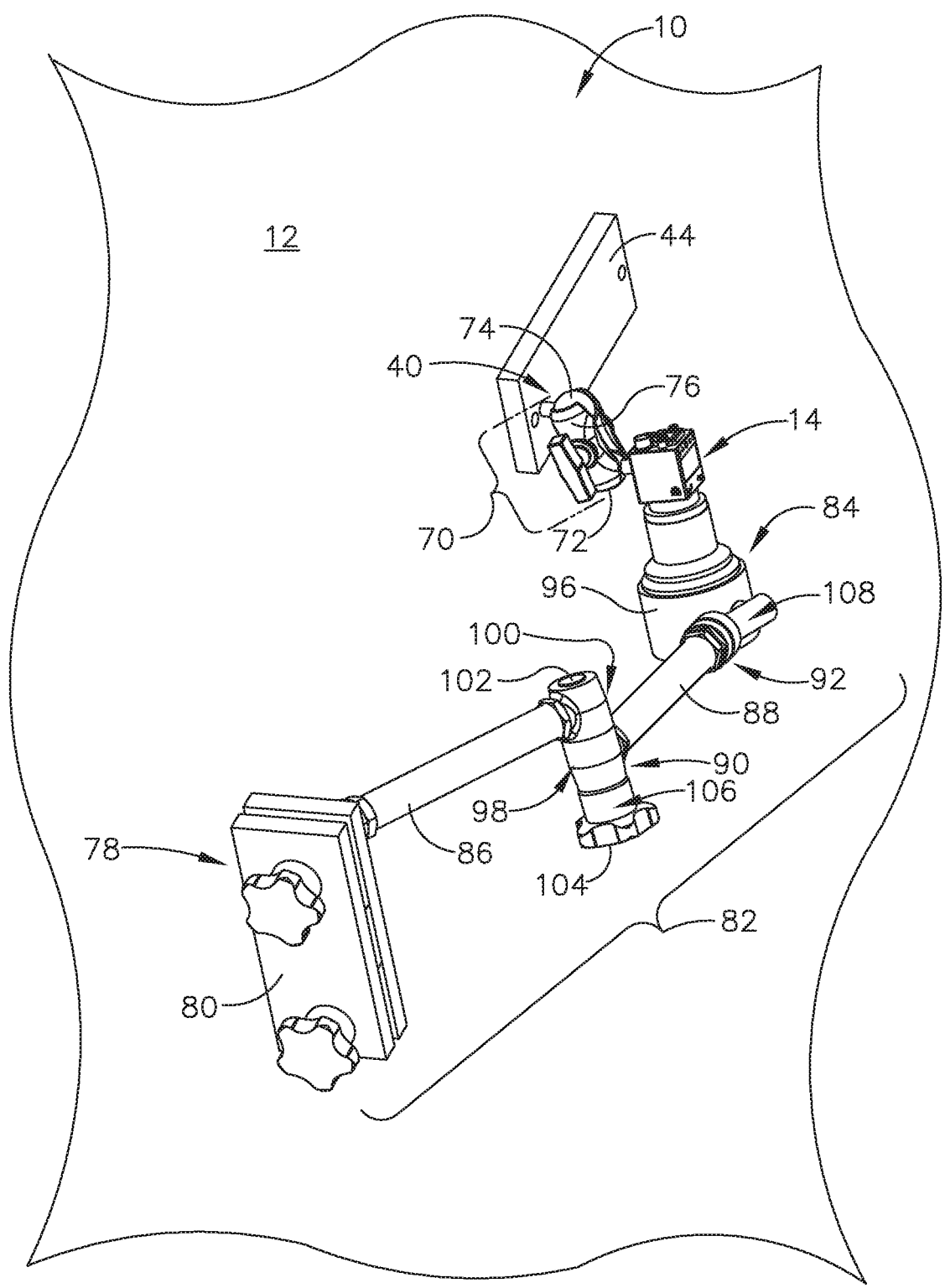
FIG. 8 is the view of FIG. 6 with the second example of the alignment apparatus for aligning the sensor on the vehicle aligned with the sensor placing the sensor in a desired position and orientation.

In referring to FIGS. 6-8 a second example of apparatus is shown for implementing method 26 for aligning a removable sensor 14 on vehicle 10. Method 26 includes step 28, as seen in the flow chart of FIG. 2, of connecting removable sensor 14 to sensor mounting device 40 which includes second ball joint assembly 70. Sensor mounting device 40, in this example, is secured to mounting plate 44, which in turn is secured to vehicle 10, which in this example is secured to wing 12 and is secured to removable sensor 14. Second ball joint assembly 70 includes first ball member 72 connected to removable sensor 14 and second ball member 74 connected to vehicle 10. First ball member 72 and second ball member 74 are positioned within clamp assembly 76, which is movable between a clamped and an unclamped position with respect to first ball member 72 and second ball member 74.

Clamp assembly 76 in a clamped position locks movement of second ball joint assembly 70 from movement about first and second ball members 72, 74. With clamp assembly 76 in an unclamped position, clamp assembly 76 is free to rotate about first ball member 72 and second ball member 74 permitting removable sensor 14 to move freely within any direction within three dimensional reference system 52, which includes x-direction, y-direction and z-direction. In this second example of apparatus for implementing method 26, removable sensor 14 placed within a desired position and orientation, clamp assembly 76 can be clamped locking removable sensor 14 in the desired position and orientation. Attaining the desired position and orientation for removable sensor 14 is discussed below.

Method 26 includes step 30, as seen in flow chart of FIG. 2, which includes connecting connector 78, as seen in FIGS. 6-8, of alignment apparatus 82 to a fixed connection location on vehicle 10, as referred to in step 34 of the flow chart of FIG. 2. Fixed connection location on vehicle 10 is a known location such that, with connector 78 connected to the fixed connection location, spatial reference component 84 of alignment apparatus 82 indicates the desired position and orientation of removable sensor 14.

In this example, connector 78 of alignment apparatus 82 includes vehicle clamp assembly 80 connecting alignment apparatus 82 to the fixed connection location on the vehicle. In this example, vehicle clamp assembly 80 is secured to a tie down hub (not shown) positioned on wing 12, which a known location on vehicle 10, such that spatial reference component 84 indicates a desired position and orientation of removable sensor 14. Alignment apparatus 82 further includes first arm 86 fixedly secured to vehicle clamp assembly 80. First arm 86 extends from vehicle clamp assembly 80 and connects to second arm 88 with lockable rotational joint 90 positioned between first arm 86 and second arm 88. Lockable ball joint assembly 92 is positioned on second arm 88 and is secured to spatial reference component 84 of alignment apparatus 82 wherein lockable ball joint assembly 92 includes third ball member 94, as seen in FIG. 7. Spatial reference component 84 of alignment apparatus 82 includes receptacle member 96 secured to the third ball member 94 of lockable ball joint assembly 92. Alignment apparatus 82 permits user to position and orient spatial reference component 84 and lock alignment apparatus 82 so as to secure the desired position and orientation indicated by spatial reference component 84 such that with connecting alignment apparatus 82 to the fixed connection location, as mentioned above, spatial reference component 84 will indicate the desired position and orientation of removable sensor 14.

Alignment apparatus 82 is positioned and oriented into a configuration such that with connector 78 of alignment apparatus 82 connected to fixed connection location on vehicle 10, as described above, spatial reference component 84, as seen in FIGS. 6 and 7. is positioned and oriented to provide removable sensor 14 a reference and guide to match the desired position and orientation of the removable sensor 14. Adjusting the current position and orientation of removable sensor 14, as seen in FIGS. 7 and 8, to align with spatial reference component 84, as seen in FIG. 8, has removable sensor 14 matching the desired position and orientation for removable sensor 14.

In positioning spatial reference component 84 to be aligned such that alignment of removable sensor 14 with spatial component 84 places removable sensor 14 in the desired position and orientation, the user adjusts the configuration of alignment apparatus 82. The adjustable configuration of alignment apparatus 82 in this example includes alignment apparatus 82 as described herein and seen in FIGS. 6-8. Alignment apparatus 82 is connected to fixed connection location on vehicle 10 with vehicle clamp assembly 80 and first arm 86 is, as mentioned above, fixedly secured to vehicle clamp assembly 80. First arm 86 connects to second arm 88 with lockable rotational joint 90 positioned between first arm 86 and second arm 88, wherein lockable rotational joint 90 has rotational collar 98 and first fixed non-rotatable collar 100 positioned about axle member 102. Second arm 88 is secured to rotational collar 98 providing second arm 88 to be rotatable about axle member 102. Handle 104 which is secured, in this example, to axle member 102, which has threads (not shown) configured to be compatible with threads (not shown) positioned within first fixed non-rotatable collar 100 positioned on one side of rotatable collar 98 and compatible threads (not shown) in second fixed non-rotatable collar 106 positioned on an opposing side of rotatable collar 98, such that with turning of handle 104 first and second fixed non-rotatable collars 100, 106 can be drawn toward one another, locking rotational collar 98 and preventing rotation of second arm 88 about axle member 102. With turning handle 104 in an opposite direction first and second fixed non-rotatable collars 100, 106 can be moved away from one another, unlocking rotatable collar 98 and permitting second arm 88 to rotate about axle member 102. This arrangement with lockable rotational joint 90 permits adjustment of position of second arm 88 about axle member 102.

Lockable ball joint assembly 92 positioned on second arm 88 has third ball member 94 secured to bracket 108 which in turn is connected to spatial reference component 84. Third ball member 94 is positioned within a receptacle (not shown) permitting third ball member 94 to rotate within the receptacle permitting positioning and orienting spatial reference component 84. In this example, alignment apparatus 82 can be locked in position such that spatial reference component 84 is in a position and orientation such that alignment of removable sensor 14 with spatial reference component 84 matches removable sensor 14 in the desired position and orientation. Spatial reference component 84 is locked into such position and orientation with handle 104, in this example, being turned to draw together first and second fixed non-rotatable collars 100, 106 to lock rotatable collar 98 also winds a cable (not shown) connected to third ball member 94, pulling third ball member 94 against receptacle (not shown) in which third ball member 94 locks third ball member 94 against the receptacle in position. In this example, handle 104 can be turned to lock rotatable collar 98 and locking second arm 88 in a desired position and at the same time locking third ball member 94 in a desired position thereby locking spatial reference component 84 in desired position. Turning handle 104 in an opposing direction unlocks rotatable collar 98 and permits rotation of second arm 88 relative to first arm 86 and unlocks third ball member 94 providing freedom of movement of spatial reference component 62 relative to second arm 88. This second example of apparatus for implementing method 26, permits the user to properly align spatial reference component 84 to in turn align removable sensor 14 into the desired position and orientation.

With alignment apparatus 82 connected to fixed connection location on vehicle 10 and with spatial reference component 84 in the proper position and orientation, removable sensor 14 can use spatial reference component 84 as a guide to be placed in the desired position and orientation. Method 26 further includes, as seen in step 36 of flow chart in FIG. 2, adjusting the current position and orientation of removable sensor 14, as seen for example in FIGS. 6 and 7, by reference to alignment apparatus 82, as seen in FIG. 8, wherein removable sensor 14 is moved into alignment with spatial reference component 84. This alignment of removable sensor 14 with spatial reference component 84 causes the current position and orientation of removable sensor 14 to match the desired position and orientation of removable sensor 14.

Figure 9:
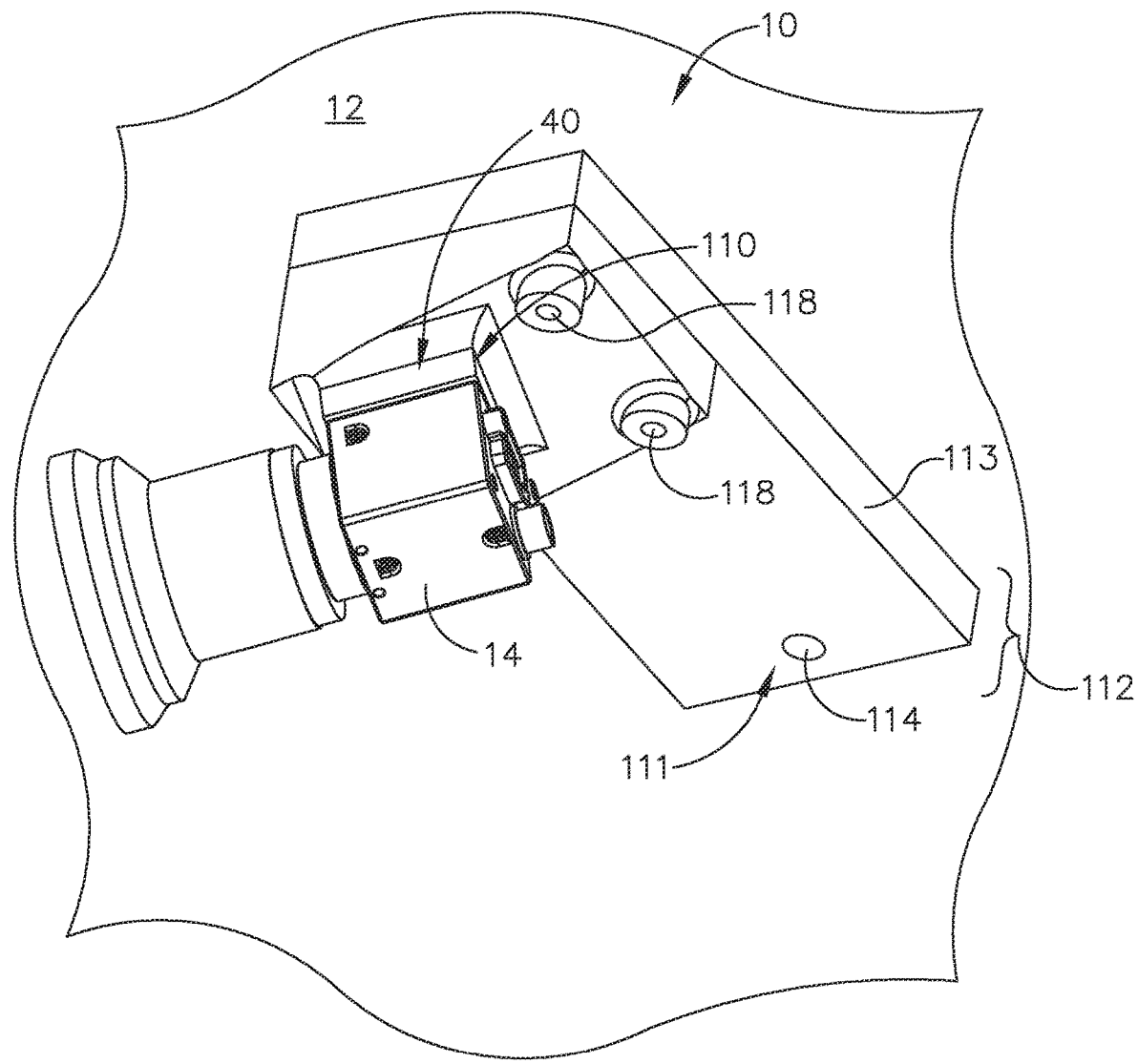
FIG. 9 is a perspective view of a third example of an alignment apparatus for aligning a sensor on the vehicle in a desired position and orientation.
Figure 10:
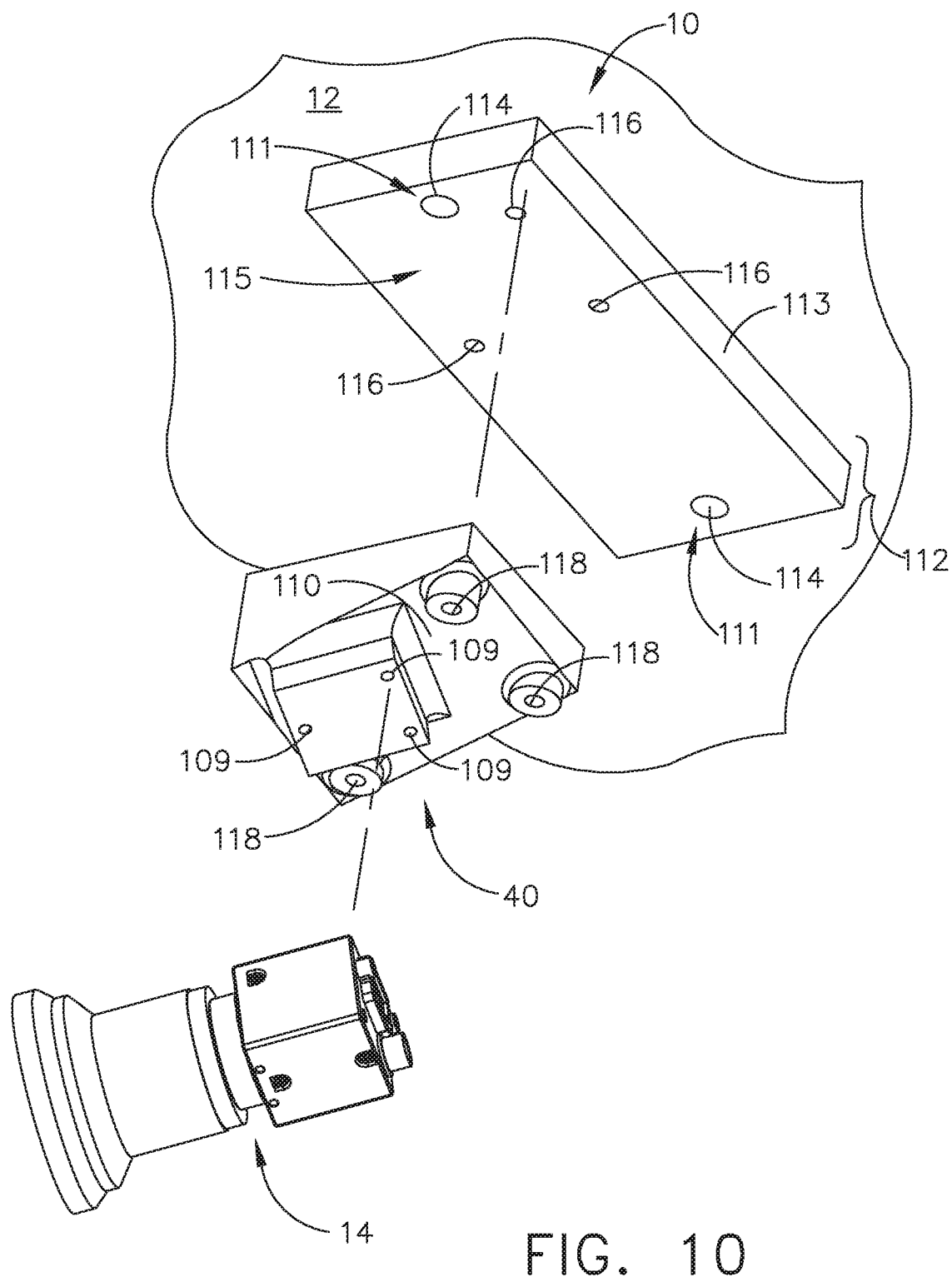
FIG. 10 is an exploded view of the third example of the alignment apparatus of FIG. 9.

In referring to FIGS. 9 and 10 the apparatus is shown for implementing the third example of method 26 for aligning a removable sensor 14 on a vehicle 10. The third example of method 26 includes step 28, as seen in the flow chart of FIG. 2, of connecting removable sensor 14 to sensor mounting device 40 which includes bracket 110. Sensor mounting device 40 has in this example three holes 109 for bolting removable sensor 14 to sensor mounting device 40. Method 26 includes steps 30 and 34, as seen in flow chart of FIG. 2, provides connecting connector 111, in this example, bolts 114, of alignment apparatus 112, which further includes plate 113 and spatial reference component 115, in this example to fixed connection location on vehicle 10, such that, with connector 111 connected to the fixed connection location, spatial reference component 115 of alignment apparatus 112 indicates the desired position and orientation of removable sensor 14. In this example, spatial reference component 115 of alignment apparatus 112 includes at least two openings 116 defined by plate 113.

As a result of the connecting of connector 111 or bolts 114 to the fixed connection location on vehicle 10 spatial reference component 115, in this example includes at least two openings 116, as mentioned above, indicates a desired position and orientation of removable sensor 14. Method 26 further includes step 36 which includes adjusting the current position and orientation of the removable sensor 14 by reference to the alignment apparatus 112 to cause the current position and orientation of the removable sensor 14 to match the desired position and orientation of the removable sensor 14. This adjusting includes moving bracket 110 to align at least two openings 118 defined in bracket 110 with the at least two openings 116 defined in plate 113. In this example, at least two openings 118 includes three openings are placed in alignment with three openings of at least two openings 116 thereby positioning and orienting removable sensor 14 to match the desired position and orientation of removable sensor 14. With alignment of three openings of the at least two openings 118 and three opening of the at least two openings 116, bracket 110 is bolted (not shown) to plate 113 securing the desired position and orientation of removable sensor 14 secured to bracket 110. As a result, of the fixed connection location being known on vehicle 10 with respect to position and orientation, securement of alignment apparatus 112 and securement of bracket 110 to spatial reference component 115 positions and orients removable sensor 14 into the desired position and orientation.

Further included is system 38, as seen in FIGS. 3-5, for aligning removable sensor 14 on vehicle 10, which in this example includes wing 12 of an aircraft 18. System 38 includes alignment apparatus 56 having (i) connector 54 configured to mount alignment apparatus 56 in a fixed position and orientation relative to removable sensor 14 and (ii) a spatial reference component 62 adjoined to connector 54 such that, when alignment apparatus 56 is mounted in the fixed position and orientation, the spatial reference component 62 has a known position and orientation relative to a current position and orientation of removable sensor 14. System 38 further includes an external positioning device 120 having (i) a measurement component configured to detect a spatial position and orientation of the spatial reference component 62 relative to at least one reference location 122 on vehicle 10, in this example, strut 124, and (ii) an output component 127, in this example via computer device configured to provide positioning data relating to the current position and orientation of the removable sensor 14 to a user, for example via output component or computer device 127 to facilitate aligning the removable sensor 14 to a desired position and orientation of removable sensor 14.

In some embodiments, the measurement component includes laser scanner 126 configured to generate data points indicating three-dimensional locations relative to laser scanner 126. For example, the laser scanner 126 may be configured to generate a three-dimensional point cloud of a region in a proximate physical environment in which the laser scanner 126 is located. In some further examples, software or hardware of the laser scanner 126 (or a computing device communicatively connected thereto) may identify objects, surfaces, edges, or other patterns in the scanned data points and generate a three-dimensional model of such data points using known techniques. Laser scanner 126 is further configured to determine the position and orientation of the spatial reference component 62 relative to laser scanner 126. In operation of system 38, laser scanner 126 scans a region including the strut 124 of the vehicle 10 and identifies laser scanner position and orientation relative to strut 124. Fixed connection locations from which removable sensor 14 is connected to vehicle 10 are known with respect to position and orientation of strut 124. Laser scanner 126 scans spatial reference component 62 which is secured to removable sensor 14, and laser scanner 126 determines the position and orientation of spatial reference component 62 in three dimensional space, which translates to the current position and orientation of removable sensor 14. The laser scanner 126 provides three-dimensional measurements to output component 127, which in this example includes a computer device. With current position and orientation of removable sensor 14 not being in the desired position and orientation, such three-dimensional measurements provide the user guidance for adjusting the position and orientation of removable sensor 14 to match the desired position and orientation for removable sensor 14. A subsequent scanning with laser scanner 126 of spatial reference component 62 provides the user either confirmation of removable sensor 14 has attained the desired position and orientation or a reiteration of the process is conducted until the desired position and orientation for removable sensor 14 is attained. Because the laser scanner 126 identifies the position and orientation of the spatial reference component 62 with greater accuracy than the laser scanner 126 identifies the position and orientation of the removable sensor 14, the spatial reference component 62 improves accuracy and ease of aligning the removable sensor 14 to a desired position and orientation.

An alignment apparatus for positioning a removable sensor 14 on vehicle 10, includes a connector configured to mount the alignment apparatus in a fixed position and orientation relative to a fixed connection location on the vehicle and includes a spatial reference component adjoined to the connector such that, when the alignment apparatus is mounted in the fixed position and orientation, the spatial reference component has a known position and orientation indicating a desired position and orientation of the removable sensor. A first example of alignment apparatus 82 is shown in FIGS. 6-8, as discussed earlier. In this example, connector 78 includes vehicle clamp assembly 80 which connects alignment apparatus 82 to connection location on vehicle 10 as discussed earlier. Alignment apparatus 82 further includes first arm 86 fixedly secured to vehicle clamp assembly 80 with first arm 86 extending from vehicle clamp assembly 80. Alignment apparatus 82 further includes second arm 88 connected to first arm 86 with lockable rotational joint 90 positioned between first arm 86 and second arm 88, as discussed earlier. In addition, alignment apparatus 82 further includes lockable ball joint assembly 92, which includes third ball member 94, wherein lockable ball joint assembly 92 is positioned on second arm 88. Spatial reference component 84 includes receptacle member 96 secured to third ball member of lockable ball joint assembly 92 of alignment apparatus 82. As explained earlier, alignment apparatus 82 can be moveable with respect to lockable rotational joint 90 and with respect to lockable ball joint assembly 92 and can be placed in a fixed position at lockable rotational joint 90 and at lockable ball joint assembly 92 such that spatial reference component 84 can be placed in a position, with vehicle clamp assembly 80 connected to connection location on vehicle 10, spatial reference component 84 provides reference for removable sensor 14 to match a desired position and orientation.

In referring to a second example of alignment apparatus 112 is shown in FIGS. 9 and 10. Alignment apparatus 112 includes connector 111 which includes bolt 114 which mounts plate 113 of alignment apparatus 112 in fixed position and orientation relative to a fixed connection location on vehicle 10, as discussed earlier. Spatial reference component 115 includes at least two openings 116 defined by plate 113, which has known position and orientation which has been translated by alignment apparatus 112 from fixed connection location which indicates the desired position and orientation of removable sensor 14, such that with at least two openings 118 of sensor mounting device 40 or bracket 110 aligned with the at least two openings 116 of spatial reference component 115, removable sensor 14 is positioned in the desired position and orientation, as described earlier.

While various embodiments have been described above, this disclosure is not intended to be limited thereto. Variations can be made to the disclosed embodiments that are still within the scope of the appended claims.

What is claimed:

1. A method for aligning a removable sensor on a vehicle, comprising:
   connecting the removable sensor to a sensor mounting device;
   connecting a connector of an alignment apparatus to either:
      the removable sensor such that a spatial reference component of the alignment apparatus, and the removable sensor are fixedly secured together wherein the spatial reference component and the removable sensor move together and the spatial reference component has a known position and orientation;
      adjusting a position and orientation of the removable sensor, relative to the sensor mounting device, using the known position and orientation of the spatial reference component of the alignment apparatus as a reference, to cause the removable sensor to match a desired position and orientation of the removable sensor; or a fixed connection location on the vehicle such that the spatial reference component of the alignment apparatus indicates the desired position and orientation of the removable sensor; and adjusting the position and orientation of the removable sensor, using the spatial reference component as a reference so as to cause the removable sensor to match the desired position and orientation of the removable sensor.

2. The method of claim 1, wherein connecting the removable sensor to the sensor mounting device, includes the sensor mounting device comprises a first ball joint assembly.

3. The method of claim 2, wherein connecting the removable sensor to the sensor mounting device, includes the first ball joint assembly comprises a first ball member connected to the removable sensor and a second ball member connected to the vehicle, with the first ball member and the second ball member positioned within a clamp assembly, which is movable between a clamped and an unclamped position with respect to the first ball member and the second ball member.

4. The method of claim 3, wherein connecting of the connector of the alignment apparatus to the removable sensor includes the connector comprises a fastener assembly having a flexible clamp for engaging the removable sensor and a first surface for abutting against a second surface of the removable sensor such that with the flexible clamp engaged to the removable sensor and the first surface and the second surface abutting one another, the fastener assembly and the removable sensor are in a fixed position in relationship to one another.

5. The method of claim 4, wherein:
the spatial reference component of the alignment apparatus comprises three wall members secured to one another in orthogonal relationship to one another; and
the fastener assembly is fixedly secured to the spatial reference component.

6. The method of claim 5, wherein adjusting the position and orientation of the removable sensor using the known position and orientation of the spatial reference component of the alignment apparatus as the reference to cause the removable sensor to match the desired position and orientation of the removable sensor, includes positioning the clamp assembly into the unclamped position with respect to the first ball member and the second ball member of the first ball joint assembly and moving the removable sensor from a current position and orientation of the removable sensor to match the desired position and orientation of the removable sensor.

7. The method of claim 1, wherein connecting the removable sensor to the sensor mounting device includes the sensor mounting device comprises a second ball joint assembly.

8. The method of claim 7, wherein connecting the removable sensor to the sensor mounting device includes the second ball joint assembly comprises a first ball member connected to the removable sensor and a second ball member connected to the vehicle with the first ball member and the second ball member positioned within a clamp assembly movable between a clamped and an unclamped positions with respect to the first ball member and the second ball member.

9. The method of claim 7, wherein connecting the connector of the alignment apparatus to the fixed connection location on the vehicle such that the spatial reference component indicates the desired position and orientation of the removable sensor includes:

the connector of the alignment apparatus comprises a vehicle clamp assembly connecting the alignment apparatus to the fixed connection location on the vehicle;
the alignment apparatus further includes a first arm fixedly secured to the vehicle clamp assembly;
the first arm extends from the vehicle clamp assembly and connects to a second arm with a lockable rotational joint positioned between the first arm and second arm;
a lockable ball joint assembly positioned on the second arm is secured to the spatial reference component of the alignment apparatus wherein the lockable ball joint assembly comprises a third ball member; and
the spatial reference component of the alignment apparatus comprises a receptacle member secured to the third ball member of the lockable ball joint assembly.

10. The method of claim 9, wherein adjusting the position and orientation of the removable sensor by the reference to the alignment apparatus to cause the position and orientation of the removable sensor to match the desired position and orientation of the removable sensor includes, with the vehicle clamp assembly secured to the fixed connection location on the vehicle, moving the removable sensor, connected to the lockable ball joint assembly, to engage the receptacle member of the spatial reference component of the alignment apparatus.

11. The method of claim 1, wherein:
connecting the removable sensor to the sensor mounting device includes the sensor mounting device comprises a bracket wherein the removable sensor is bolted to the bracket; and
connecting the connector of the alignment apparatus to the fixed connection location on the vehicle such that the spatial reference component indicates the desired position and orientation of the removable sensor, wherein the connector comprises a bolt, which affixes a plate, of the alignment apparatus, to the vehicle wherein the plate has at least two openings defined in the plate which indicate the desired position and orientation for the removable sensor.

12. The method of claim 11,
wherein the vehicle is an aircraft, and
wherein adjusting a current position and orientation of the removable sensor by the reference to the alignment apparatus to cause the current position and orientation of the removable sensor to match the desired position and orientation of the removable sensor includes moving the bracket to align the at least two openings defined in the bracket with the at least two openings defined in the plate.

13. A system for aligning a removable sensor on a vehicle, comprising:
an alignment apparatus having (i) a connector configured to mount the alignment apparatus in a fixed position and orientation relative to the removable sensor and (ii) a spatial reference component adjoined to the connector such that, when the alignment apparatus is mounted in the fixed position and orientation, the spatial reference component has a known position and orientation; and
an external positioning device having (i) a measurement component configured to detect a spatial position and orientation of the spatial reference component relative to at least one reference location on the vehicle and (ii) an output component configured to provide positioning data relating to a current position and orientation of the removable sensor to a user to facilitate aligning the removable sensor to a desired position and orientation of the removable sensor.

14. The system of claim 13, wherein the measurement component comprises a laser scanner configured to generate data points indicating three-dimensional locations relative to the laser scanner.

15. The system of claim 14, wherein the laser scanner is further configured to determine a position of the spatial reference component relative to the laser scanner.

16. An alignment apparatus for positioning a removable sensor on a vehicle, comprising:
a connector configured to mount the alignment apparatus in a fixed position and orientation relative to a fixed connection location on the vehicle; and
a spatial reference component adjoined to the connector such that, when the alignment apparatus is mounted in the fixed position and orientation, the spatial reference component has a known position and orientation indicating a desired position and orientation of the removable sensor.

17. The alignment apparatus of claim 16, wherein:
the connector comprises a vehicle clamp assembly;
the alignment apparatus further includes a first arm fixedly secured to the vehicle clamp assembly and the first arm extends from the vehicle clamp assembly;
the alignment apparatus further includes a second arm connected to the first arm with a lockable rotational joint positioned between the first arm and second arm; and
the alignment apparatus further includes a lockable ball joint assembly, which comprises a third ball member, wherein the lockable ball joint assembly is positioned on the second arm with the third ball member.

18. The alignment apparatus of claim 17, wherein the spatial reference component comprises a receptacle member secured to the third ball member of the lockable ball joint assembly of the alignment apparatus.

19. The alignment apparatus of claim 16, wherein:
the connector comprises a bolt which mounts a plate of the alignment apparatus in a fixed position and orientation relative to a fixed connection location on the vehicle.

20. The alignment apparatus of claim 19, wherein the spatial reference component comprises at least two openings defined by the plate which has the known position and orientation indicating the desired position and orientation of the removable sensor, such that with the removable sensor secured to a bracket which defines at least two openings and with the at least two openings of the bracket in alignment with the at least two openings of the plate, the removable sensor is in the desired position and orientation of the removable sensor.

* * * * *